United States Patent [19]
Gabriel

[11] 4,413,799
[45] Nov. 8, 1983

[54] DEVICE FOR FASTENING ELONGATED SYNTHETIC RESIN PROFILES

[75] Inventor: Fredy Gabriel, Reussbühl, Switzerland

[73] Assignee: Stapro AG, Lucerne, Switzerland

[21] Appl. No.: 281,645

[22] Filed: Jul. 9, 1981

[51] Int. Cl.³ .............................................. F16L 3/16
[52] U.S. Cl. .................................................... 248/59
[58] Field of Search ...................... 248/59, 58, 62, 65, 248/323, 327, 343, 74 R, 70, 316 A, 230, 226.1; 24/263 A

[56] References Cited

U.S. PATENT DOCUMENTS

| | | | |
|---|---|---|---|
| 1,398,294 | 11/1921 | Carlson | 248/60 |
| 1,579,418 | 4/1926 | Tomkinson | 248/59 |
| 3,295,812 | 1/1967 | Schneider et al. | 248/230 X |
| 3,575,367 | 4/1971 | Welsh | 248/59 |
| 4,305,557 | 12/1981 | Kowalski | 248/59 X |

FOREIGN PATENT DOCUMENTS

| | | | |
|---|---|---|---|
| 2309664 | 9/1973 | Fed. Rep. of Germany | 248/59 |
| 2225679 | 11/1974 | France . | |
| 2313620 | 12/1976 | France . | |

*Primary Examiner*—William H. Schultz
*Assistant Examiner*—Ramon O. Ramirez
*Attorney, Agent, or Firm*—Karl F. Ross; Herbert Dubno

[57] ABSTRACT

A hanger for synthetic resin profiles comprises a band or strap which reaches around a portion of the periphery of a synthetic resin profile, generally a tube, and passes over a support which is connected to a threaded element upon which the support is suspended. A shoe is disposed between this support and the opposite side of the periphery of the synthetic resin tube. The band, the support and the shoe are all adjustable in position on the threaded rod.

13 Claims, 4 Drawing Figures

DEVICE FOR FASTENING ELONGATED SYNTHETIC RESIN PROFILES

FIELD OF THE INVENTION

My present invention relates to a device for securing elongated parts to a structure and, more particularly, to a hanger for suspending elongated parts from a roof or floor structure or for mounting such parts on a wall, the parts being generally synthetic resin profiles in the form of tubular elements.

Specifically the invention relates to a device for fixing installation parts and particularly plastic material profiles.

BACKGROUND OF THE INVENTION

Devices for securing a part in a particular position vis-à-vis another structure are available in a wide variety of shapes and sizes and utilize any of a variety of adjustment techniques as well as techniques for mounting upon the structure or for engagement with the part.

Particular problems are, however, encountered with devices for mounting elongated parts composed of synthetic resin or plastic material upon a structure, e.g. for mounting adjustably so-called synthetic resin profiles and especially tubular members.

The term "profiles" is used herein to refer to elongated synthetic resin members of any closed peripheral shape, the periphery being circular or polygonal and the body being generally hollow or tubular although the principles of the invention apply to solid bodies as well.

Obviously when a tubular body constitutes a synthetic resin part to be mounted in a particular position, orientation or location on or with respect to a support structure such as a floor, ceiling, roof or wall member of a building, it is usually inappropriate to drill through or pierce the tubular member so as to enable it to receive a threaded anchor such as a bolt since penetration of the tubular member creates sealing problems whether the tubular member serves as an electrical conduit or as a fluid-carrying duct.

It is, therefore, desirable to support such members by means engageable externally therewith and it is known, for example, to suspend pipes by hangers which react beneath the pipe and are connected to ceiling joists.

Such systems, while effective for elongated members in the form of metal pipes, beams or the like, do not afford sufficient positional stability with respect to many synthetic resin members.

Thus mounting devices have been devised which engage the peripheries of elongated synthetic resin members and serve to connect them to the support structure.

However, experience with such synthetic resin profiles has shown that they have greater thermal coefficients of expansion than metal or concrete members and, when synthetic resin tubes, for example, are subjected to varying temperatures, the expansion and contraction effects upon the tube length tend to cause buckling of the synthetic resin members when they are rigidly or fixedly held at spaced-apart locations on the support.

Conversely, systems which tightly engage all around the periphery of synthetic resin members are not capable of yielding in response to expansion and contraction in the transverse direction or in the peripheral direction caused by temperature fluctuations. Damage to the synthetic resin member can thus occur.

Attempts to solve these problems by the use of conventional tube clamps and suspending arrangements have not proved to be fully satisfactory. For example, a system of the type described in Swiss Pat. No. 467,965 provides vertical adjustability but does not represent a solution to the buckling problem and the same can be said for the system described in U.S. Pat. No. 4,019,705. The band clamp of German patent document No. 27 34 789 does not provide a solution for damage to the synthetic resin member which, may result from transverse or circumferential expansion or enable longitudinal dimensional changes in an effective manner.

Reference may also be had to U.S. Pat. Nos. 3,575,367 and 1,398,294, to French Pat. Nos. 2,313,620, 2,209,909, and 2,225,679, and to German patent document 2,417,942.

OBJECTS OF THE INVENTION

It is the principal object of the present invention to provide an improved device for anchoring elongated synthetic resin profiles to a structure whereby disadvantages of earlier systems are avoided and the device can provide stable positioning of the synthetic resin profile while accommodating transverse, peripheral and longitudinal dimensional changes.

Another object of the invention is to provide a low-cost, simple and economically assembled or affixed device for positioning an elongated synthetic resin member, especially a hollow member such as a tube or pipe so that buckling of the profile does not occur when it is subjected to temperature change and which also permits transverse expansion and contraction as well as sliding movement in the longitudinal direction.

Yet another object of this invention is to provide a highly versatile anchor for the purposes described.

SUMMARY OF THE INVENTION

These objects and others which will become apparent hereinafter are attained, in accordance with the present invention, in a device for securing an elongated synthetic resin profile, especially a plastic tube or pipe, to a structure, this device comprising a band which reaches around, conforms to and engages part of the periphery of the plastic member and has its ends passing over and enclosing a rigid support bar, a shoe being braced against this bar and bearing upon and preferably conforming to the other portion of the periphery of the plastic member, i.e. the portion not engaged by the flexible band or being positioned between the member and the support bar.

The shoe and the support are mutually adjustable upon a threaded rod which is connected to the structure, i.e. can be moved independently on the rod or jointly thereon. The device can engage the plastic profile in various ways and can be mounted on the support in various ways to ensure full versatility of the device.

According to a feature of the invention, the band has openings at its free ends through which the rod is threaded as the rod passes out of the support bar which can have ends bent toward the plastic member to be supported so as to enable the band to bend with a minimum of stressing or kinking around these ends of the support.

According to yet another feature of the invention, the shoe is part of a U-shaped member whose bight extends to or forms the support bar and is fixed to the rod via the nut, the two shanks reaching away from this bight and bearing against the aforementioned other side of the plastic member. The shanks can be provided with feet conforming to the surface contour of this other side or can be connected to a single foot bearing upon the member.

Alternatively, the shoe can have a generally L-shaped structure with one leg of the L lying parallel to the support bar and braced thereagainst or against the rod while the other leg extends at an angle to the first and bears with a shoe against the aforementioned other side of the member. Nuts threaded onto the rod can serve for adjustment. The shoe, moreover, can be formed in one piece and the band can have one end fixed or integral with the support bar while the other end is formed with the opening through which the rod passes. Of course the band may be secured at both ends to the support bar or the shoe if desired.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
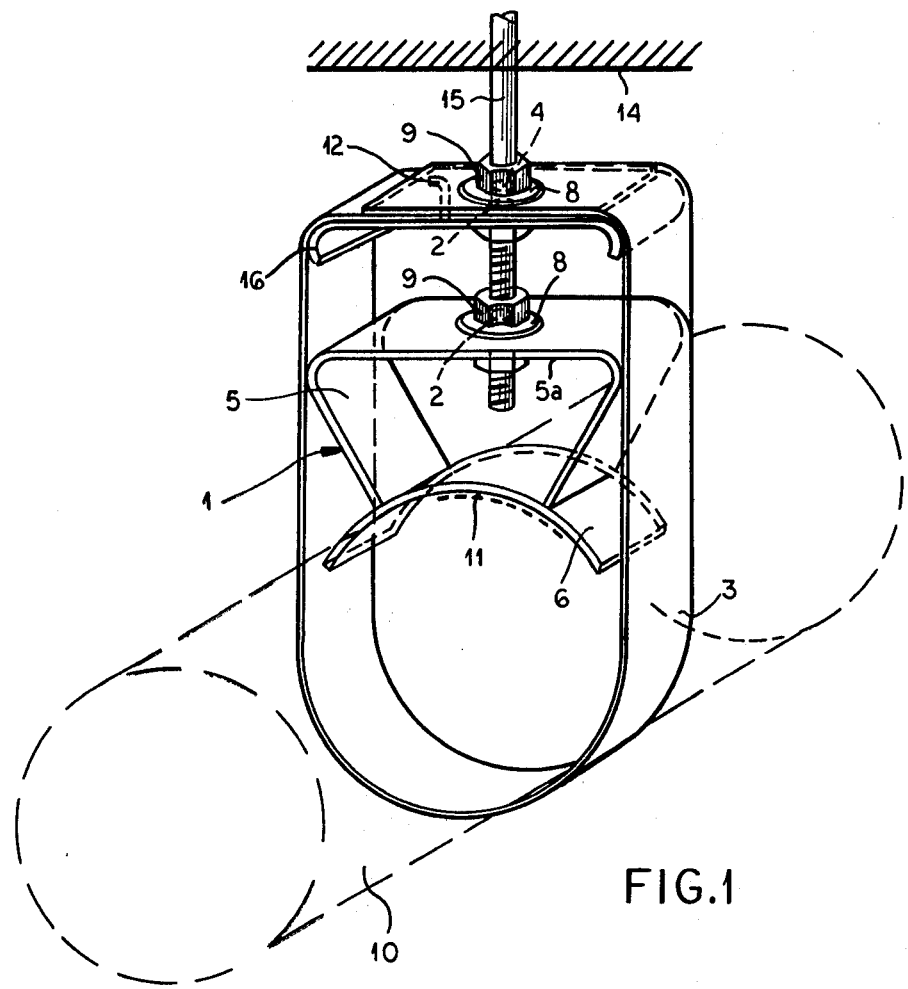
FIG. 1 is a diagrammatic perspective view of a device in accordance with the present invention.

As can be seen from FIG. 1, the circular-cross section pipe or tube composed of plastic material is subtended by a band or strap 3 provided with a support bar 16, bent downwardly at its ends to allow the extremities of the strap to pass thereover without kinking. The ends of the strap have openings 4 which register with one another so that a closed loop is formed by the band and the support bar 16.

A shoe 1 has a downwardly directed U-shaped member 5 whose bight 5a is braced via a rod 15 against the support bar 16 and whose shanks reach downwardly and bear against a foot 6 which rest against the opposite side of member 10 or can be positioned so that a slight gap 11 is formed between this foot and member 10. Thus members 5a and the shanks can be considered to be angularly adjoining portions of the shoe 1 one of which (5a) is adjustably affixed to the rod 15 while the other bears upon the pipe 10 via memeber 6.

The shoe 1 and the support 16 have openings 2 which register with the openings 4 of strap 3, the threaded rod 15 extending through these openings and being connected to a support structure in any conventional manner. The support structure has been represented at 14. Nuts 9 threaded onto the rod are tightened to clamp against opposite sides of the bight 5a via washers 8 and against the underside of support 16 and the uppermost end of strap 3, respectively, also via washers 8.

If the rod 15 is first mounted on the support 14, it is convenient to lock the ends of the strap to the support 16 by a pin 12 before adjustably securing it to the rod via the nuts and washers.

Figure 2:
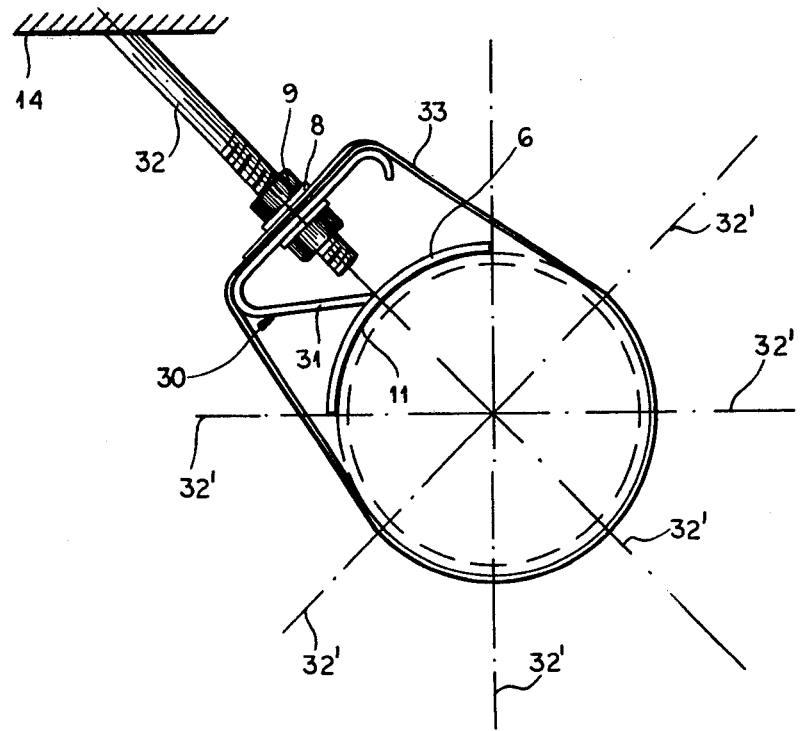
FIG. 2 is an end view showing the device in another embodiment disposed at an angle to the vertical.

In the embodiment of FIG. 2, the support bar is formed by the upper leg of an L-shaped member whose downwardly inclined leg 31 is formed with a foot 6 and constitutes the shoe. The member 30 can be formed in one piece and the opposite ends of the band 33 bent over the support bar and locked thereto and to the rod 32 by the washers and nuts 8 and 9 as shown. The axis of the rod can assume any one of a number of angular positions represented diagrammatically at 32.

Figure 3:
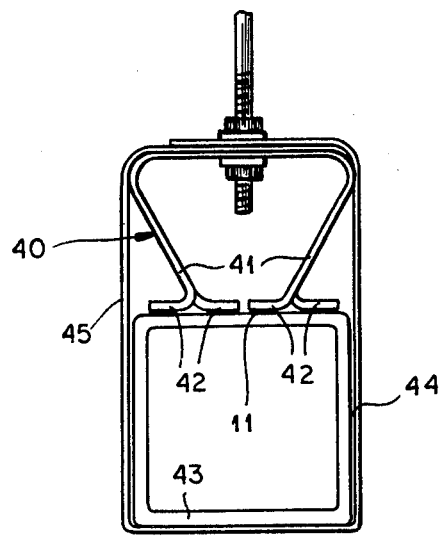
FIG. 3 is an end view of yet another embodiment of the device showing its engagement with a rectangular-cross section pipe or tube.
Figure 4:
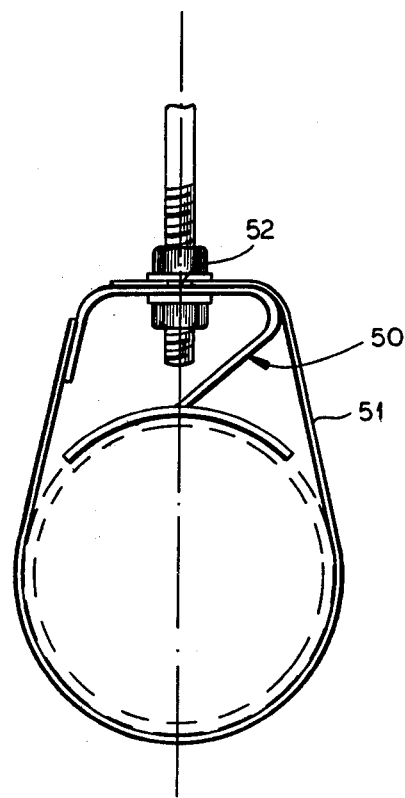
FIG. 4 is an end view showing still a third embodiment of the invention.

FIG. 3 shows another embodiment of the invention in which the support bar is formed by a U-shaped member whose shanks 41 are formed with feet 42 bent in opposite directions and separated by slits in these shanks, the feet 42 being juxtaposed with the opposite side of the square profile 43 which is surrounded on its other sides by the strap 45. The ends of the strap, provided with holes, are bent over the support bar and are traversed by the rod being held in place by nuts and washers in the manner described. Lateral clearance 44 can be provided along two opposite sides of member 43. In the embodiment of FIG. 4, one end of the strap 51 is affixed to the support leg of an L-shaped member 50 whose other leg forms the shoe as described in connection with FIG. 2. The opposite end of the strap has an opening through which the rod passes and which is secured at 52 to the support bar and to the rod via nuts and washers as shown.

I claim:

1. A device for mounting an elongated member upon a structure which comprises:

a threaded rod affixed to said structure;

a support bar adjustably mounted on and fixed to said rod;

a strap having its opposite ends connected to said support bar and reaching around one side of said member; and a shoe adjustably mounted on said rod independently of said bar and reaching toward the opposite side of said member and juxtaposed with said opposite side whereby said member is retained between said shoe and said strap with at least limited freedom of longitudinal sliding displacement and transverse expansibility, said shoe having at least a pair of angularly adjoining portions one of which is adjustably fixed to said rod while another bears upon said member via a foot.

2. The device defined in claim 1 wherein said support bar is mounted on said rod separately from said shoe.

3. The device defined in claim 1 wherein said support bar is formed unitarily with said shoe.

4. The device defined in claim 1 in combination with said member wherein said shoe is provided with a foot conforming to the contour of said opposite side of said member and juxtaposed therewith.

5. A device for mounting an elongated member upon a structure which comprises:

a threaded rod affixed to said structure;

a support bar adjustably mounted on and fixed to said rod;

a strap having its opposite ends connected to said support bar and reaching around one side of said member; and a shoe adjustably mounted on said rod and reaching toward the opposite side of said member and juxtaposed with said opposite side whereby said member is retained between said shoe and said strap with at least limited freedom of longitudinal sliding displacement and transverse expansibility, said shoe having a U-shape with a bight adjustably affixed to said rod and shanks reaching toward said member.

6. A device for mounting an elongated member upon a structure which comprises:

a threaded rod affixed to said structure;

a support bar adjustably mounted on and fixed to said rod;

a strap having its opposite ends connected to said support bar and reaching around one side of said member; and a shoe adjustably mounted on said rod and reaching toward the opposite side of said member and juxtaposed with said opposite side whereby said member is retained between said shoe and said strap with at least limited freedom of longitudinal sliding displacement and transverse expansibility, said shoe being generally L-shaped having one leg adjustably secured to said rod and another leg inclined to said one leg and reaching toward said member.

7. The device defined in claim 5 wherein said strap has opposite ends provided with holes registering with one another, overlying said support bar and traversed by said rod.

8. The device defined in claim 5 wherein said strap has one end fixed to said support bar and another end overlying said support bar and provided with a hole traversed by said rod.

9. The device defined in claim 6 wherein said support bar is mounted on said rod separately from said shoe.

10. The device defined in claim 6 wherein said support bar is formed unitarily with said shoe.

11. The device defined in claim 6 wherein said shoe is provided with a food conforming to the contour of said opposite said member and juxtaposed therewith.

12. The defice defined in claim 6 wherein said strap has opposite ends provided with holes registering with one another, overlying said support bar and traversed by said rod.

13. The device defined in claim 6 wherein said strap has one end fixed to said support bar and another end overlying said support bar and provided with a hole traversed by said rod.

* * * * *